UNITED STATES PATENT OFFICE.

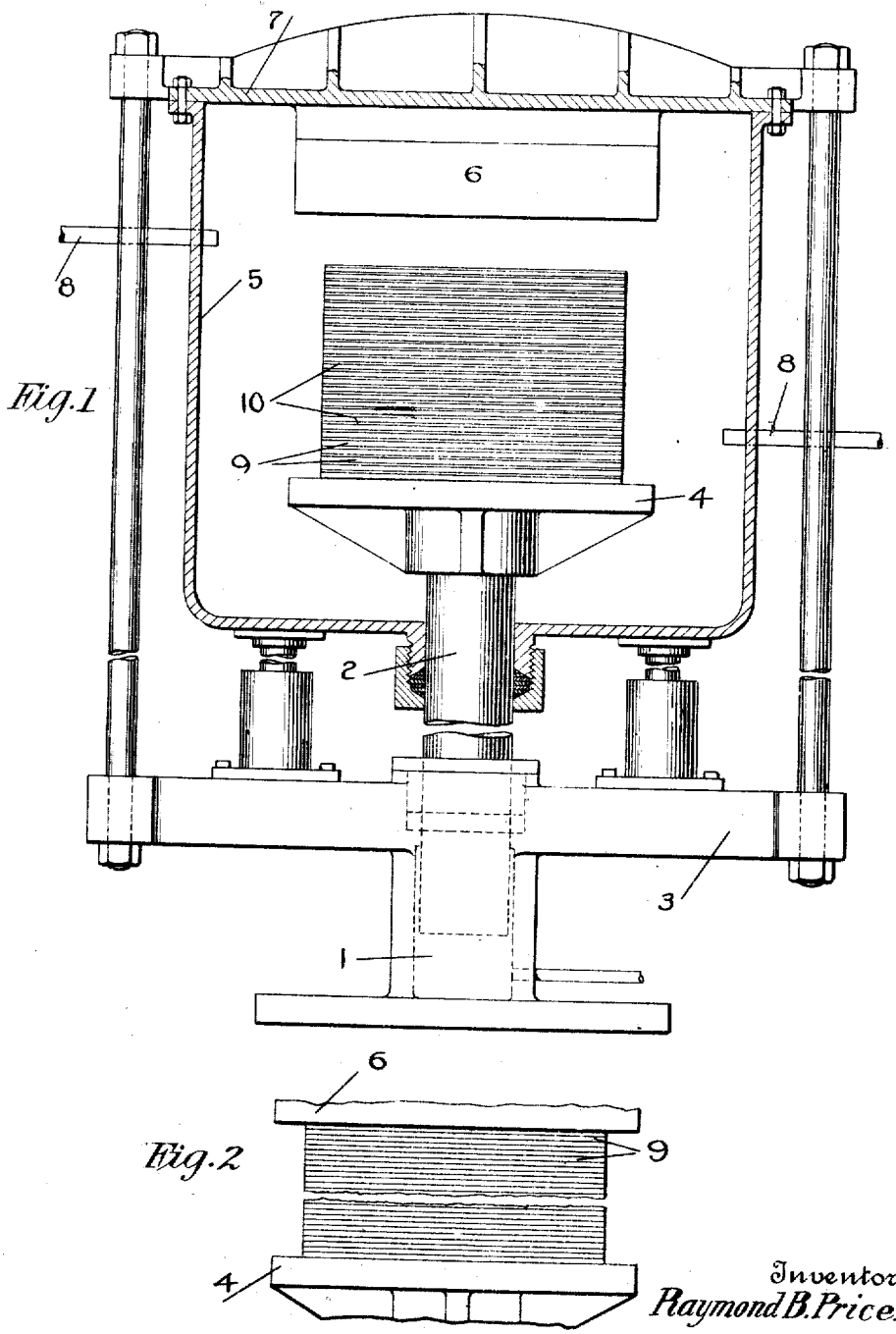

RAYMOND B. PRICE, OF NEW YORK, N. Y., ASSIGNOR TO RUBBER REGENERATING COMPANY, A CORPORATION OF INDIANA.

METHOD OF TREATING SHEETS OF VULCANIZABLE PLASTICS.

1,211,487.  Specification of Letters Patent.  Patented Jan. 9, 1917.

Application filed April 29, 1915, Serial No. 24,756. Renewed July 7, 1916. Serial No. 107,973.

*To all whom it may concern:*

Be it known that I, RAYMOND B. PRICE, a citizen of the United States, residing in the city, county and State of New York, have invented certain new and useful Improvements in Methods of Treating Sheets of Vulcanizable Plastics, of which the following is a full, clear, and exact description.

My invention relates to a method of treating sheeted vulcanizable plastics and more particularly to a treatment thereof preparatory to subjecting the material to the action of a vulcanizing medium.

In preparing sheeted vulcanizable plastic for vulcanization, the superficial area as compared with the mass of the material; the flexibility of the material; and the conditions attendant upon the formation of a plurality of plies of the sheeted material incidental to the convenient handling and vulcanizing thereof, result in a tendency to trap air and other gases or sometimes volatile fluids between succeeding plies or within the plies themselves. When the product sought is vulcanized sheets of the plastic, this condition results in the likelihood of superficial blemishes on the sheets. If however, it be desired to combine a plurality of layers of the material into a solid mass or block of material, it is likely there will be concealed pockets in the mass thus formed, or blisters upon the surface thereof.

By my present invention, I am enabled to prepare sheeted vulcanizable plastic for vulcanization in a manner to obviate the presence of entrapped fluids between adjacent layers in the body of a mass of material formed by a plurality of such layers and from the sheets themselves. In securing these results, the air, gas or other fluids present between succeeding sheets or layers by reason of the manner of disposing one layer upon another, either in contact or with a separating medium is removed prior to vulcanization as are also the fluids that may have been entrapped in the material itself. Any fluid imprisoned in the body of the material, as well as the fluid entrapped between the layers is also removed either wholly, or in such a degree as to result in a product substantially free from material defects resulting from the presence of the fluids during vulcanization thereby obtaining a solid homogeneous mass. Subsequently to the withdrawal of these fluids, the accumulation of layers are compacted with a resultant closure of any voids or pockets resulting from the withdrawal of the fluids, thereby imparting a substantially uniform density to the sheeted plastic.

The invention consists primarily in the method of treating sheeted vulcanizable plastic consisting in superimposing or plying up a plurality of layers of vulcanizable plastic one upon another, and withdrawing fluids from between said sheets or layers by subjecting them to a reduced fluid pressure, and to a mechanical pressure, the latter being applied for any desired period previous to, concurrently with, or subsequently to the application of the reduced fluid pressure, or the mechanical pressure may be applied during two or even all three of these periods as may be found necessary in any particular instance to produce the desired results, and in such other novel steps as are hereinafter set forth and described and more particularly pointed out in the claims hereto appended.

In the accompanying drawings, I have illustrated two aspects of my invention, one wherein the product sought is separable sheets of material prepared for vulcanization as sheets, and the other wherein the product is a solid homogeneous mass of material prepared for vulcanization.

In the drawings: Figure 1 is a view of a hydraulic press and its appurtenances, which may be used in the practice of my invention, separable sheets being shown under treatment thereby, and Fig. 2 is a view of the press table and head, sheets to be compacted in a homogeneous mass being shown under treatment thereby.

Like letters refer to like parts in both of said views.

Referring to the drawings, 1 indicates the cylinder, 2 the piston and 3 the main frame of the press. The piston 2 supports the usual table 4 within a chamber 5. Oppositely disposed to said table is a head 6 carried by the top 7 for the chamber 5. Communicating with the chamber 5 is one or more conduits 8 connected with a suction pump or other pressure controlling mechanism (not shown).

While the foregoing mechanism forms no part of my invention it is adapted for use in the practice of my invention, and my improved method will be described in connection with this particular mechanism, it being understood that the invention is not limited to the use of any particular mechanism. For instance, in ead of piling the sheets as here shown they might be rolled in a coil or instead of coiling separate sheets a single long sheet may be formed and then coiled, and the coil may be subjected to a compacting pressure by any preferred or well known means instead of the press here shown.

When it is desired to produce separable sheets of vulcanizable plastic for vulcanization, a plurality of sheets 9 are superimposed one upon another, separated by sheets 10 of tin-foil, or other suitable material which will have the effect of preventing the adhesion of succeeding sheets to each other. In the drawings, the sheets 9 are shown as laid perfectly flat, in a pile on the table 4, and alternated with and separated by the strata of separating medium 10. The pressure within the chamber 5 is then reduced, the lowering of the pressure, or the presence of a vacuum or partial vacuum about the pile, resulting in the removal of any air, gases or other fluids trapped between the sheets and the separating medium, or within the body of any sheet. If desired, the chamber may be heated as for instance by supplying heat to the table 4 and head 6 to accelerate the action resulting from the low pressure within the chamber 5. When heat is used, however, where the rubber has compounded with it the sulfur necessary for vulcanization, it should be at a temperature below the vulcanizing point. The withdrawal of the fluids from between succeeding layers of the pile, will have a tendency to cause a settling of the pile. The reduced pressure about the pile is maintained for a sufficient period to remove substantially all of the air, gases, or other fluids between or within the sheets. Thereafter, the pile is compressed under pressure through the admission of fluid to the cylinder 1, while maintaining the reduced pressure surrounding it, thus compacting the pile in its entirety as well as the sheets of plastic contained therein. This pressure will bring adjoining sheets of the pile, whether of plastic material or of a separating medium, into such intimate contact as to close all voids and prevent the entrance of air or other gases therebetween or within the material, when the low pressure in the chamber 5 is relieved.

When practising the invention in the manner illustrated in Fig. 2 a plurality of sheets of vulcanizable plastic are piled one upon another in surface contact with each other. The subjection of the pile so formed, first to a reduced pressure about the pile, and second to compression while maintaining this reduced pressure thereabout will have the same effect as heretofore described, except that in the absence of a separating medium between succeeding sheets of the plastic, the product instead of being a pile of separable sheets, will be a solid, homogeneous mass of the plastic free from entrapped air, gases, or other fluids.

The compression of the pile in either instance referred to, will have the effect of sealing the edges of the pile in a manner to prevent the entrance of air or other gases to replace those withdrawn during that interval when the pile is subjected to a reduced pressure.

Rubber stock made according to my invention is ordinarily intended to be subsequently given its final shape and then vulcanized. It is feasible however, when desired, to vulcanize the sheets or mass of rubber, during or subsequent to the application of the reduced pressure, directly within the apparatus employed for preparing the rubber. In such a case means are afforded for supplying the required degree of heat to the chamber containing the goods, which may be attained by any well-known or preferred manner.

Having described my invention what I claim as new and desire to have protected by Letters Patent is:

1. The method of treating sheets of vulcanizable plastic consisting in superimposing a plurality of sheets of vulcanizable plastic one upon another, and thereafter withdrawing fluids from within and between said sheets by subjecting the pile to a reduced pressure.

2. The method of treating sheets of vulcanizable plastic consisting in superimposing a plurality of sheets of vulcanizable plastic one upon another, thereafter withdrawing fluids from within and between said sheets by subjecting the pile to a reduced pressure and finally compressing the pile.

3. The method of treating sheets of vulcanizable plastic consisting in superimposing a plurality of sheets of vulcanizable plastic one upon another, thereafter subjecting the pile to the action of heat insufficient to vulcanize said plastic, and simultaneously therewith or subsequently thereto withdrawing fluids from within and between said sheets by subjecting the pile to a reduced pressure.

4. The method of treating sheets of vulcanizable plastic consisting in superimposing a plurality of sheets of vulcanizable plastic one upon another, thereafter subjecting the pile to the action of heat insufficient to vulcanize said plastic simultaneously therewith or subsequently thereto, withdrawing fluids from within and between said sheets by subjecting the pile to a reduced pressure and finally compressing the pile while subjecting it to the reduced pressure.

5. The method of treating sheets of vulcanizable plastic consisting in superimposing a plurality of alternately arranged sheets of vulcanizable plastic and strata of a non-vulcanizable separating medium, and withdrawing fluids from within said sheets and from between them and said separating strata by subjecting the pile to a reduced pressure.

6. The method of treating sheets of vulcanizable plastic consisting in superimposing a plurality of alternately arranged sheets of a vulcanizable plastic and strata of a non-vulcanizable separating medium, withdrawing fluids from within said sheets and from between them and said separating strata by subjecting the pile to a reduced pressure and compressing the pile while subjecting it to a reduced pressure.

7. The method of treating sheets of vulcanizable plastic consisting in superimposing a plurality of alternately arranged sheets of vulcanizable plastic and strata of a non-vulcanizable separating medium, subjecting the pile to the action of heat insufficient to vulcanize the plastic and withdrawing the fluids from within said sheets and from between them and said separating strata by subjecting the pile to a reduced pressure.

8. The method of treating sheets of vulcanizable plastic consisting in superimposing a plurality of alternately arranged sheets of vulcanizable plastic and strata of a non-vulcanizable separating medium, subjecting the pile to the action of heat insufficient to vulcanize the plastic, withdrawing the fluids from within said sheets and from between them and said separating strata by subjecting the pile to a reduced pressure, and compressing the pile while subjecting it to a reduced pressure.

9. The method of treating sheets of vulcanizable plastic consisting in forming a pile of alternately arranged flat sheets of vulcanizable plastic and strata of a non-vulcanizable separating medium, reducing the pressure about said pile whereby the fluids will be withdrawn therefrom, and thereafter compressing said pile to close the voids resulting from the withdrawal of said fluids.

10. The method of treating sheets of vulcanizable plastic consisting in superimposing a plurality of sheets of vulcanizable plastic one upon another, thereafter subjecting said sheets to the action of a reduced pressure until the fluids from within and between said sheets are substantially removed, and before said reduced pressure is discontinued subjecting the pile to a compacting pressure.

Signed at New York, N. Y., this 27th day of April, 1915.

RAYMOND B. PRICE.